(12) United States Patent
Von Der Weiden

(10) Patent No.: US 11,570,997 B2
(45) Date of Patent: Feb. 7, 2023

(54) CONVEYING SCREW FOR A CUTTING AND SEPARATING DEVICE

(71) Applicant: SEPAgrind GmbH, Overath (DE)

(72) Inventor: Helmut Von Der Weiden, Feilbingert (DE)

(73) Assignee: SEPAGRIND GMBH, Overath (DE)

( * ) Notice: Subject to any disclaimer, the term of this patent is extended or adjusted under 35 U.S.C. 154(b) by 0 days.

(21) Appl. No.: 17/641,489

(22) PCT Filed: Sep. 8, 2020

(86) PCT No.: PCT/IB2020/058335
§ 371 (c)(1),
(2) Date: Mar. 9, 2022

(87) PCT Pub. No.: WO2021/048738
PCT Pub. Date: Mar. 18, 2021

(65) Prior Publication Data
US 2022/0264899 A1    Aug. 25, 2022

(30) Foreign Application Priority Data
Sep. 9, 2019   (DE) .................... 10 2019 006 336.8

(51) Int. Cl.
*A22C 17/00*    (2006.01)
*B02C 18/30*    (2006.01)

(52) U.S. Cl.
CPC ........ *A22C 17/0026* (2013.01); *B02C 18/305* (2013.01)

(58) Field of Classification Search
CPC ............................ A22C 17/026; B02C 18/305

USPC ................................... 452/135, 138
See application file for complete search history.

(56) References Cited

U.S. PATENT DOCUMENTS

| 2,841,197 | A | | 7/1958 | Ardrey |
| 3,132,680 | A | | 5/1964 | Schill et al. |
| RE32,060 | E | | 12/1985 | McFarland |
| 5,580,305 | A | * | 12/1996 | McFarland ........... B02C 18/301 241/74 |

(Continued)

FOREIGN PATENT DOCUMENTS

| DE | 102017003407 B3 | 9/2018 |
| RU | 2064339 C1 | 7/1996 |

*Primary Examiner* — Richard T Price, Jr.
(74) *Attorney, Agent, or Firm* — Hudak, Shunk & Farine Co., LPA

(57) ABSTRACT

A conveying screw for a cutting and separating device, including a screw shaft having at least one helical screw flight integrally moulded thereon, which, in an installed position, has a front flank for transporting a foodstuff by pushing, a rear flank arranged on the opposite side, and, at its distal end between the front flank and the rear flank, a cylindrical portion, which is formed in the transition region to the front flank of the screw flight with a sharpened cutting edge, the sharpened cutting edge having a positive rake angle (γ) arranged between the front flank and a processing plane oriented at right angles to the screw shaft. The cutting performance of the cutting and separating device are significantly improved as the sharpened cutting edge is formed from a groove made on a distal end of the front flank, the outer contour of which groove cuts into the cylindrical portion.

20 Claims, 3 Drawing Sheets

(56) References Cited

U.S. PATENT DOCUMENTS 8,951,101 B2 * 2/2015 Smith .................. A22C 17/004
                                                      452/138
2013/0252523 A1 9/2013 Eisiminger

* cited by examiner

CONVEYING SCREW FOR A CUTTING AND SEPARATING DEVICE

FIELD OF THE INVENTION

The invention relates to a conveying screw for a cutting and separating device comprising a screw shaft having at least one helical screw flight integrally moulded thereon, which, in an installed position, has a front flank for transporting a foodstuff by pushing, a rear flank arranged on the opposite side, and, at its distal end between the front flank and the rear flank, a cylindrical portion, which is formed in the transition region to the front flank of the screw flight with a sharpened cutting edge, the sharpened cutting edge having a positive rake angle ($\gamma$) arranged between the front flank and a processing plane oriented at right angles to the screw shaft. The invention is also implemented in a cutting and separating device.

BACKGROUND OF THE INVENTION

The conveying screw contained in the cutting and separating devices are often used in the food industry, in particular for the shredding and further processing of meat. In the food industry, lean meat muscle groups with a low proportion of collagenous tissue are of particular interest when processing meat, for example into sausage products. However, the meat to be processed is usually also interspersed with fatty tissue, collagenous tissue and tendons, which should be sorted out as completely as possible during the comminution and removed from the processing cycle.

Cutting and separating devices according to DE 10 2017 003 407 B3, for example, are used to remove these unwanted components. The cutting and separating devices have a shredding drum with a pressure housing in which the conveying screw is rotatably mounted. The pressure housing has a plurality of radially aligned cutting openings. Food to be processed is fed into the pressure housing via an inlet opening, in which softer parts of the food to be processed escape into the cutting openings due to the pressure transmitted to the food by the conveying screw, are cut off as food studs and are pressed out of the pressure cylinder through the cutting openings. This is the food ingredient desired for further processing. Stringy material and unusable solids do not take part in the shredding process and leave the pressure housing through an outlet opening at the end, However, it has been shown that with increasing operating time, material with great strength such as collagen, for example, adheres to the inner wall and covers the cutting openings, so that these are no longer available for the comminution work and the cutting performance of the cutting and separating device decreases, U.S. Pat. No. 32,060 E discloses a cutting device with a conveying screw mounted therein. On an inflow-side section, the conveying screw is designed on its front flank with a concavely shaped screw flight, as a result of which an outer end of the screw flight protrudes in the conveying direction. The protruding outer end of the screw flight serves to push fragments of bony material towards the axis of the conveying screw.

U.S. Pat. No. 2,841,197 also describes a cutting device with a conveying screw arranged therein. The conveying screw can also be manufactured as a cast moulding, for which the mold has a taper at the radial end portion of the conveying screw so that no special machining of the blades is required to obtain the taper in the assembled machine.

The underlying object of the invention was to improve a conveying screw in such a way that the cutting performance of the cutting and separating device is significantly improved.

The object is achieved according to the invention with the features of a conveying screw, comprising a screw shaft having at least one helical screw flight integrally moulded thereon, which, in an installed position, has a front flank for transporting a foodstuff by pushing, a rear flank arranged on the opposite side, and, at its distal end between the front flank and the rear flank, a cylindrical portion, which is formed in the transition region to the front flank of the screw flight with a sharpened cutting edge, the sharpened cutting edge having a positive rake angle ($\gamma$) arranged between the front flank and a processing plane oriented at right angles to the screw shaft, wherein the sharpened cutting edge is formed from a groove made on a distal end of the front flank, the outer contour of which groove cuts into the cylindrical portion. The positive rake angle engages behind and removes particularly effectively adhesions of a food to be processed, which get into the effective range of the conveying screw, from the inner wall of the shredding drum of a cutting device. The rake angle is preferably between 10° and 50°, particularly preferably 20° and 40°, very particularly preferably between 25° and 35°.

The sharpened cutting edge is formed from a groove made at a distal end of the front flank, the outer contour of which intersects the cylindrical portion. In this embodiment, the outer contour of the groove forms the relevant section of the front flank of the screw flight. In this case, the rake angle is arranged between the outer contour of the groove and the processing plane. The wedge angle then extends between the outer contour of the groove and the cylindrical portion of the screw flight. An inner contour of the groove merges into the front flank of the screw flight in the direction of the screw shaft. In the radial direction, the width of the groove occupies only a partial section of the front flank or of the radius of the screw flight.

Advantageously, a wedge angle of 40° to 80°, particularly preferably 50° to 70°, very particularly preferably 55° to 65°, is formed between the front flank and the cylindrical portion.

A radius or a bevel is expediently arranged between the cylindrical portion and the rear flank. Such a reduction in material reduces the temperature rise in the food to be processed and thereby lowers the bacterial load.

The invention is also implemented in a cutting and separating device with the conveying screw according to the invention, wherein the conveying screw is rotatably mounted in a pressure housing of a shredding drum, which is formed with an inlet opening at a first end portion and with an outlet opening at a second end portion, wherein a plurality of cutting openings are arranged in a pressure housing portion of the pressure housing and pass right through the pressure housing portion from an inner wall to an outer wall.

The sharpened cutting edge is preferably formed on a section of the conveying screw which sweeps over the cutting openings. The food to be processed is only chopped up in this area, with the risk of the cutting openings being covered. A feeding section of the conveying screw, which can be arranged upstream between the pressure housing portion with the cutting openings made therein and the inlet opening of the pressure housing, does not require a sharpened cutting edge. As a result, the production costs of the conveying screw can be reduced considerably, since the sharpened cutting edge only has to be shaped in sections on the conveying screw.

The cylindrical portion of the screw flight can have a width which is at least the diameter of the cutting openings on the inner wall. With this dimensioning and the operational loads to be expected, the screw flight has sufficient strength without reversible deformation. In addition, the cutting performance and quality are favorably influenced, since the piece of meat held in the cutting opening is completely detached from the foodstuff to be processed in the pressure housing portion.

It has turned out to be particularly advantageous if the cutting openings are oriented with hole axes which are inclined at an angle in relation to the inner wall. The cutting openings emerge on the inner wall of the pressure housing and, when the cutting and separating device is in operation, perform the majority of the cutting work on the food to be processed. The inclined hole axes of the cutting openings result in a particularly sharp, cutting opening edge with a wedge angle of less than 90° in the transition area between cutting opening and inner wall. On the other hand, on the opposite side of the cutting opening edge, the cutting opening has a drawing-in opening edge with an obtuse angle greater than 90°, into which the foodstuff to be processed migrates particularly favorably. The inclined hole axes of the cutting openings make it particularly easy to produce the sharp, cutting opening edge and the blunt, drawing-in opening edge.

Advantageously, the angle of the inclined hole axis includes a first angle, which is arranged on the side of the cutting opening facing away from the inlet opening of the pressure housing between the hole axis and the inner wall. At the first angle, the axis of the hole is inclined towards the inlet opening of the pressure housing. In the axial direction of the pressure housing, its radius is expediently aligned with the axis of the hole. Each cutting opening can therefore have, with the inner wall of the pressure housing portion, a cutting opening edge facing the outlet opening and a drawing-in opening edge facing the inlet opening.

Since the food to be processed is advanced from the inlet opening essentially axially through the pressure housing in the direction of the outlet opening, the cutting edge of the cutting opening is formed on the side facing away from the inlet opening of the pressure housing and thus opposes the main direction of movement of the food to be processed. This results in a clean separating cut without significant crushing of the food to be processed.

The first angle is preferably between 60° and 88°, particularly preferably 65° to 85°, very particularly preferably 70 to 80°. The smaller the first angle, the sharper is the cutting opening edge formed from it, which results in a particularly high cutting performance with high quality of the food component desired for further processing.

With a smaller first angle, however, the wear-related service life of the shredding drum also decreases.

The hole axes are sensibly aligned in such a way that the cutting opening edge between the inner wall and the hole axis is formed at the first angle. The wedge angle of the cutting opening edge corresponds to the first angle of the associated hole axis.

The angle may comprise a second angle which is located in the circumferential direction of the pressure housing portion between the hole axis and the radius of the pressure housing portion. As a result, the hole axes are additionally inclined in the circumferential direction of the pressure housing portion. As a result, the cutting edge of the cutting opening moves further in the transverse direction from the side of the cutting opening directed towards the outlet opening of the pressure housing and, in the case of a rotating conveying screw, is essentially perpendicular to the foodstuff that is also rotating at least partially.

The second angle is advantageously between 2° and 30°, particularly preferably 5° to 25°, very particularly preferably 10 to 20°. The second angle thus corresponds to the absolute value of the difference between 90° and the first angle.

The second angle is expediently aligned counter to a direction of rotation of the conveying screw. As a result, the cutting opening edge of the cutting opening is shifted laterally from the position originally facing the outlet opening and protrudes in the direction of the approaching front flank of the screw flight as well as the foodstuff to be processed in front of it. In this embodiment too, the drawing-in opening edge is opposite the cutting opening edge and is first swept over by the front flank of the screw flight. Due to this alignment of the hole axis, the cutting opening is particularly well filled and the food piece already located in the cutting opening is separated particularly cleanly.

In the axial direction and/or in the circumferential direction, opening edges of adjacent cutting openings can be aligned with one another in an overlapping manner. This avoids the formation of webs and part of the food to be processed being conveyed through the pressure housing portion without contact with a cutting opening. Advantageously, cutting openings arranged one behind the other in the axial direction are aligned offset to one another in the circumferential direction with an offset angle of 3° to 9°, particularly preferably 4° to 8°, very particularly preferably 5° to 7°.

BRIEF DESCRIPTION OF THE DRAWINGS

For better understanding, the invention is explained in more detail below with reference to six figures showing in.

DETAILED DESCRIPTION OF THE INVENTION

Figure 1:
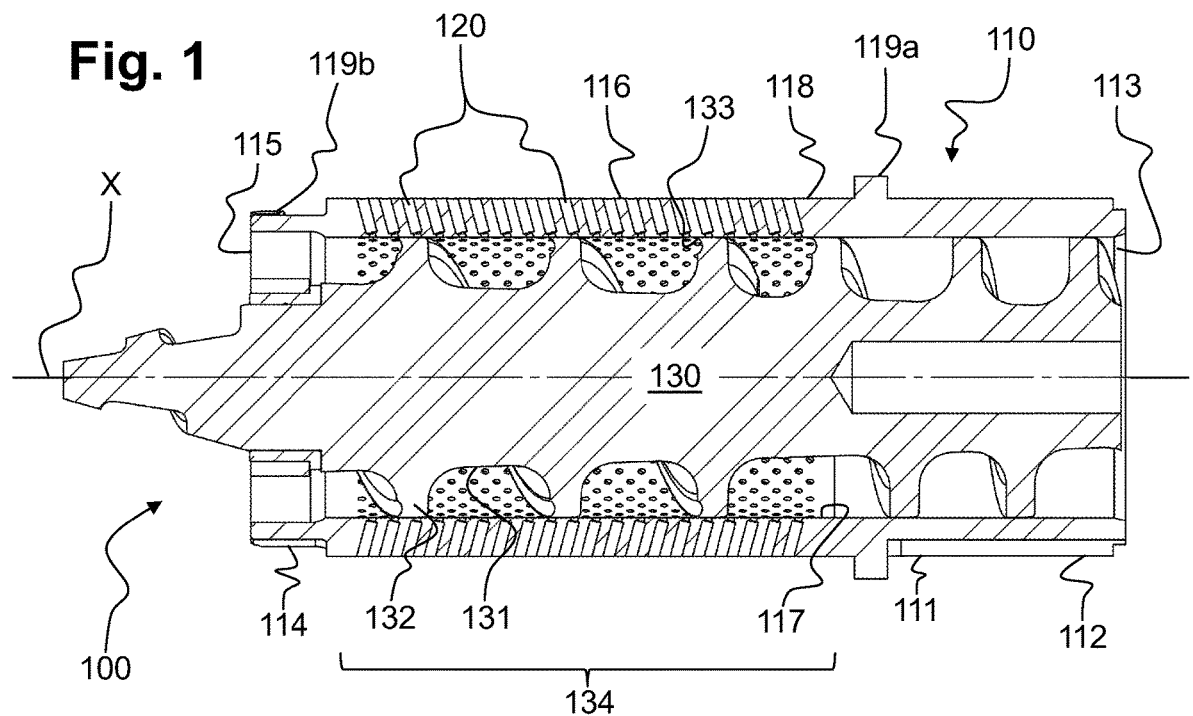
FIG. 1 a longitudinal section through a cutting and separating device with a shredding drum according to a first embodiment and a conveying screw arranged therein.

FIG. 1 shows a longitudinal section through a cutting and separating device 100 with a shredding drum 110 and a conveying screw 130 arranged coaxially therein. The shredding drum 110 comprises a pressure housing 111, on the first end portion 112 of which an inlet opening 113 is formed, through which the foodstuff to be comminuted is fed to the shredding drum 110. At the opposite end of the pressure housing 111 there is a second end portion 114 on which an outlet opening 115 is formed, through which sinewy material and unusable solids are conveyed out of the pressure housing 111. The inlet opening 113 and the outlet opening 115 each form opposite, axial openings of the pressure housing 111.

An upstream connection means 119a is attached to the first end portion 112 of the pressure housing 111 on the shredding drum 110, via which a detachable connection to a feed channel or a feed hopper (not shown here) can be established. The shredding drum 110 also has, on the second end portion 114 of the pressure housing 111, a downstream connection means 119b, to which, for example, a throttle valve (also not shown) for controlling the food pressure within the pressure housing 111 can be attached.

The pressure housing 111 of the shredding drum 110 has a pressure housing portion 116 with a multiplicity of cutting openings 120 which run continuously from an inner wall 117 of the pressure housing portion 116 to an outer wall 118. The food component desired for further processing escapes through the cutting openings 120.

The conveying screw 130 includes a rotatably driven screw shaft 131 whose axis of rotation is aligned with a housing longitudinal axis X of the pressure housing 111. At least one screw flight 132 is formed on the screw shaft 131 and surrounds the screw shaft 131 in a spiral shape in the axial direction. When the screw shaft 131 rotates, due to its pitch, the food in the pressure housing 111 is pushed forward from the inlet opening 113 in the direction of the outlet opening 115. During this process, a pressure builds up inside the food to be processed, which pushes the food to be processed into the cutting openings 120 so that a food stud is formed within the cutting opening 120. Due to the continuous feed movement of the food to be processed applied by the conveying screw 130, the food stud tears off the food remaining in the pressure housing portion 116 and penetrates the pressure housing 111 through the cutting opening 120 to the outside.

However, only in the area of the pressure housing portion 116, i.e. in a sweeping section 134 of the conveying screw 130 sweeping over the cutting openings 120, at its outer end, the screw flight 132 has a sharpened cutting edge 133, the shape and function of which will be explained below in connection with FIG. 4 to FIG. 6.

Figure 2:
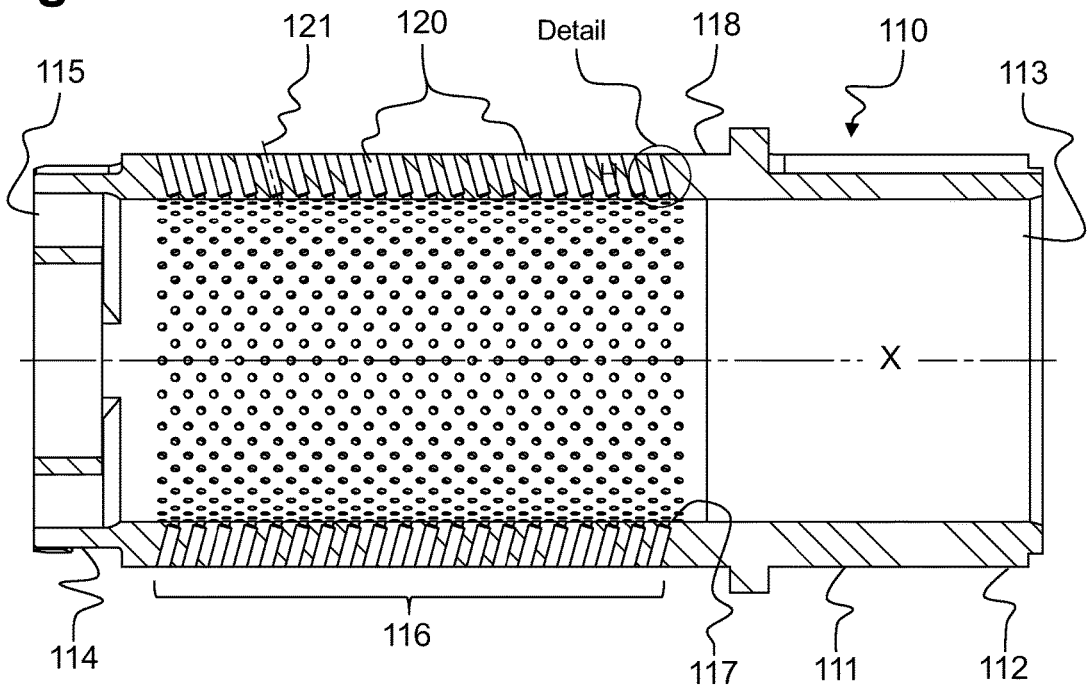
FIG. 2: a longitudinal section through the shredding drum according to FIG. 1.

As can be seen particularly well in FIG. 2, the cutting openings 120 do not run through the pressure housing portion 116 in the radial direction, but are inclined with their hole axis 121. The inclination of the hole axis 121 is selected in such a way that it faces the inlet opening 113 on the inner wall 117.

Figure 3:
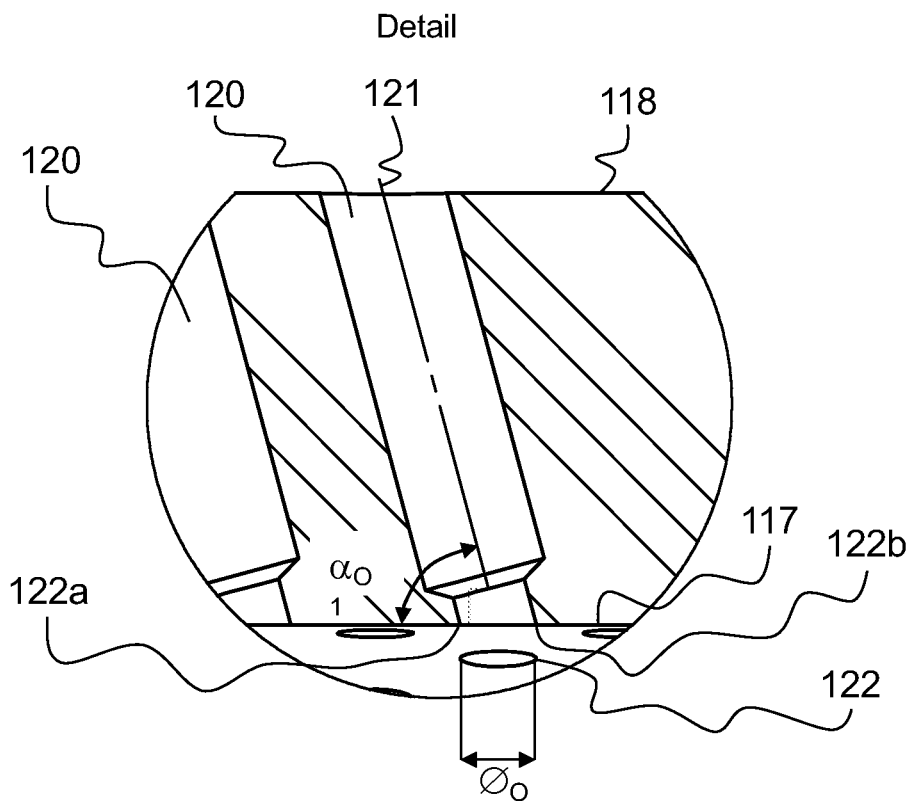
FIG. 3: an enlarged longitudinal section through the detail of FIG. 2.

An enlargement of the detail relating to the cutting openings 120, among other things, is shown in FIG. 3. The cutting openings 120 are designed as stepped bores with an outer, larger-diameter cross-section and an inner, smaller-diameter cross-section, whereby the food component required for further processing is heated relatively little and the gem load is reduced, since the food stud already severed in the cutting openings 120 can expand into the larger diameter cross-section.

However, only the diameter $\varnothing_O$ of the cutting openings 120 arranged in the area of the inner wall 117 is involved in the comminution work of the food to be processed. The hole axis 121 is inclined at a first angle $\alpha_{O1}$. The angle $\alpha_{O1}$ is located on the side of the outlet opening 115 between the hole axis 121 and the inner wall 117 or the longitudinal axis X of the pressure housing 111.

Each cutting opening 120 has a circumferential opening edge 122 in the transition area to the inner wall 117 of the pressure housing portion 116, of which a part facing the outlet opening 115 serves as a cutting opening edge 122a and a part facing the inlet opening 113 as a drawing-in opening edge 122b for the food to be chopped. The inclination of the hole axis 121 at the first angle $\alpha_{O1}$ results in a particularly sharp cutting opening edge 122a at the same acute angle $\alpha_{O1}$. The drawing-in opening edge 122b, on the other hand, has an obtuse angle greater than 90° and thereby promotes the entry of the food to be chopped into the respective cutting opening 120.

The size of the obtuse angle of the drawing-in opening edge 122b is 180° minus the first angle $\alpha_{O1}$.

Figure 4:
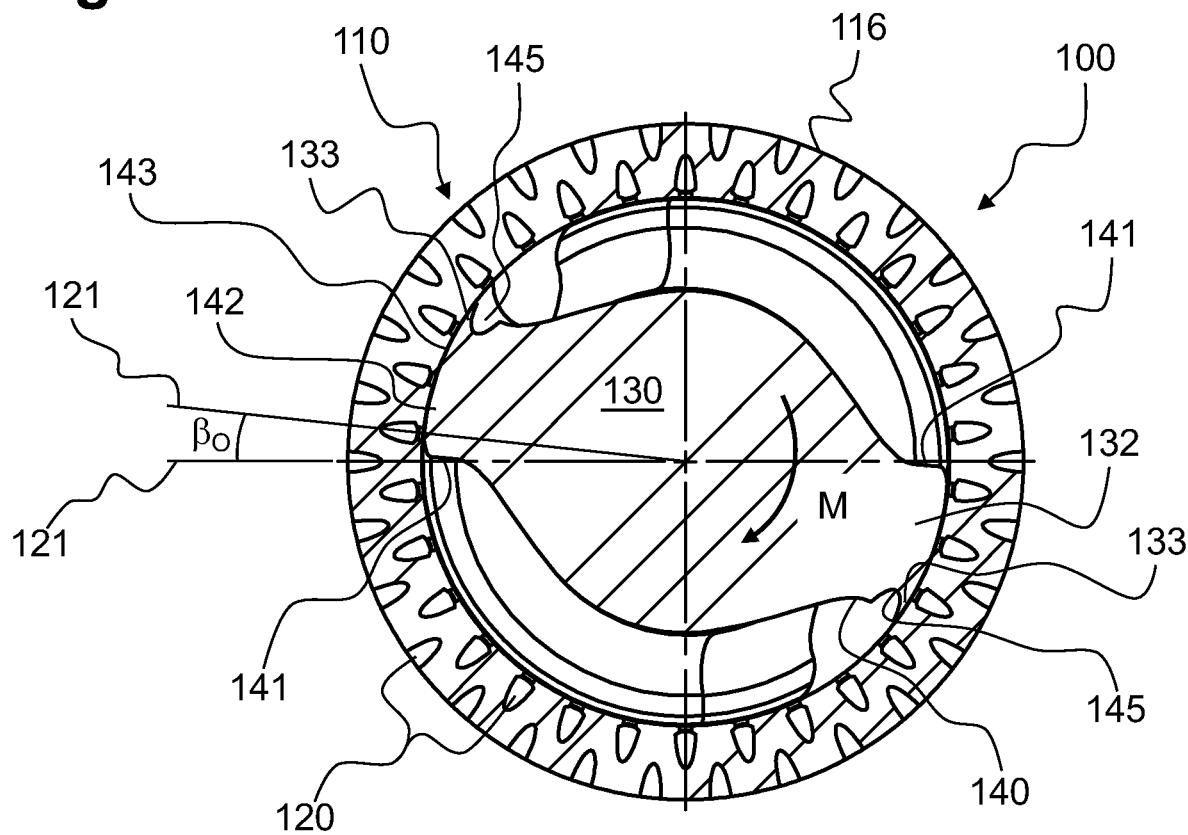
FIG. 4: a cross section through the cutting and separating device according to FIG. 1 in the area of the pressure housing portion.

FIG. 4 shows a cross section through the cutting and separating device 100 with a shredding drum 110 according to a first embodiment, in which the cutting openings 120 run radially towards the longitudinal axis X of the housing in the cross-sectional plane. Cutting openings 120 arranged axially offset in the image plane are arranged in relation to the cutting openings 120 in front of them in the image plane in such a way that their hole axes 121 are aligned offset by an angle $\beta_O$ in the circumferential direction with respect to one another.

The conveying screw 130 rotates in the direction of rotation M, clockwise in the image plane of FIG. 4. The screw flight 132 has a front flank 140, which is arranged at the front in the direction of rotation M, and a rear flank 141, which is arranged at the rear in the direction of rotation M. A cylindrical portion 143 can be seen between the front flank 140 and the rear flank 141 at each distal end 142 of the screw flight 132, which is shaped complementary to the inner wall 117 of the pressure housing portion 116.

The sharpened cutting edge 133 comprises a groove 145 placed in the front flank 140, wherein the outer contour 146 (FIG. 5) of which adjoins the cylindrical portion 143 and merges into it. The groove 145 is formed equidistant to the cylindrical portion 143 over the axial course of the conveying screw 130 and extends over the entire section 134 sweeping over the cutting openings 120. The groove 145 is always formed in the radial direction only over a part of the front flank 140 of the screw flight 132.

In the direction of the screw shaft 131, an inner contour 148 of the groove 145 borders on the front flank 140 of the screw flight 132, wherein the front flank 140 extends up to the screw shaft 131. The groove 145 has a width $R_N$ in the radial direction which is less than preferably 30%, particularly preferably 25%, of a load-bearing radius $R_S$ of the screw flight 132.

With the help of the sharpened cutting edge 133, in particular, adhesions of the food to be processed on the inner wall 117 of the pressure housing portion 116 can be peeled off, so that they do not permanently lie over the cutting openings 120 and thereby prevent the food to be processed from entering the cutting openings 120. Such adhesions usually consist of collagenous material, which has up to twenty times the strength of lean meat and hardly penetrates into the cutting openings 120 due to its high strength. Buildup peeled off by the sharpened cutting edge 133 is transported in the direction of the outlet opening 115 and removed there from the shredding drum 110.

Figure 5:
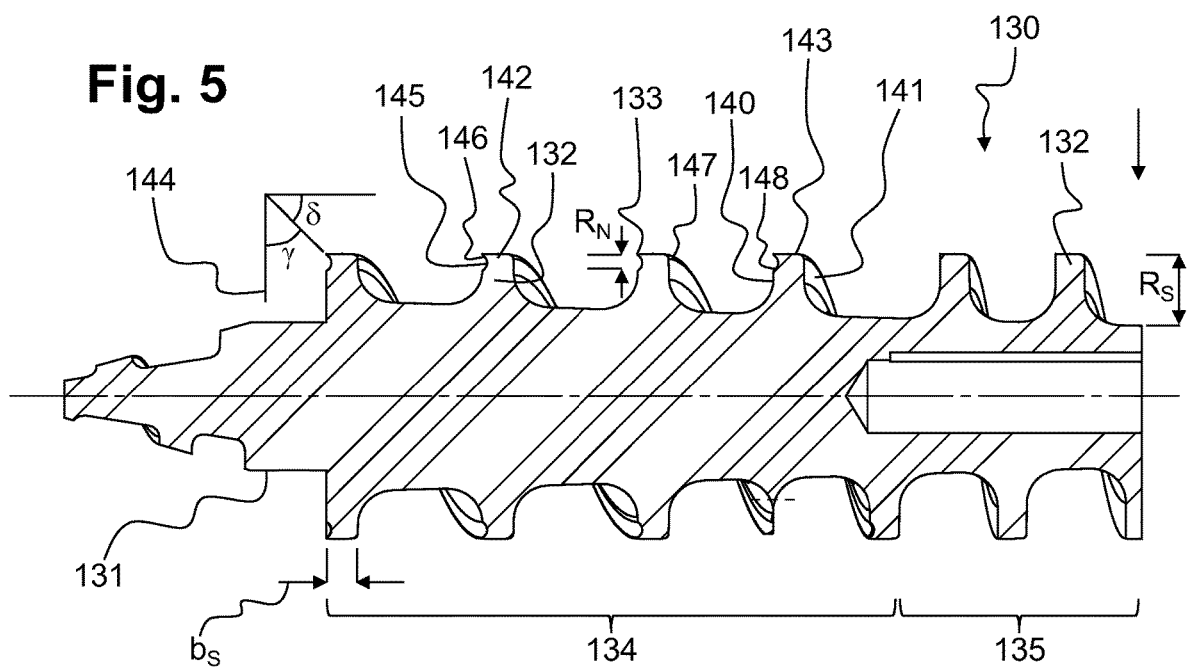
FIG. 5: a longitudinal section through the conveying screw according to FIG. 1 and FIG. 6: a cross section through the cutting and separating device with a shredding drum according to a second embodiment in the area of the pressure housing portion.

In a longitudinal section through the conveying screw 130, FIG. 5 shows that the sharpened cutting edge 133 is formed from the outer contour 146 of the groove 145 and the cylindrical portion 143. The sharpened cutting edge 133 has a rake angle $\gamma$ that is spanned between a processing plane 144 that is perpendicular to the axial extension of the conveying screw 130 and the outer contour 146 of the groove 145. A wedge angle $\delta$ is arranged between the outer contour 146 of the groove 145 and the cylindrical portion 143 of the screw flight 132. Since the clearance angle is always 0° due to the cylindrical portion 143 of the screw flight 132, the sum of the rake angle γ and the wedge angle δ is always 90°.

The sharpened cutting edge 133 is only present in the sweeping section 134 traversing the cutting openings 120. In a feeding section 135 of the conveying screw 130, which protrudes beyond the pressure housing 111 of the shredding drum 110 between the pressure housing portion 116 with the cutting openings 120 and the inlet opening 113, the conveying screw 130 only has a conventional screw flight 132, which has a cutting edge being designed for example with a rake angle γ of 90°. Since there are no cutting openings 120 in the pressure housing 111 in this area, they are not clogged by adhesions of the food to be processed and consequently do not have to be removed from the sharpened cutting edge 133 of the conveying screw 130.

For a high cutting performance of the cutting and separating device 100, the screw flight 132 in the area of the section 134 sweeping over the cutting openings 120 has a width $b_S$ that corresponds at least to the diameter $Ø_O$ of the cutting openings 120 on the inner wall 117 of the pressure housing portion 116. The width $b_S$ forms the perpendicularly distance between the front flank 140 and the rear flank 141 of the screw flight 132.

A bevel 147 is formed in the transition area between the cylindrical portion 143 of the screw flight 132 and the associated rear flank 141, which also contributes to reducing the heating of the food to be processed. Instead of a bevel 147, a radius or another geometric shape can also be provided in the transition area between the cylindrical portion 143 and the rear flank 141; it is always essential that there is a reduction in the material of the screw flight 132 in this area. The bevel 147 runs in accordance with the groove 145 exclusively in the sweeping section 134 of the conveying screw 130 that sweeps over the cutting openings 120.

Figure 6:
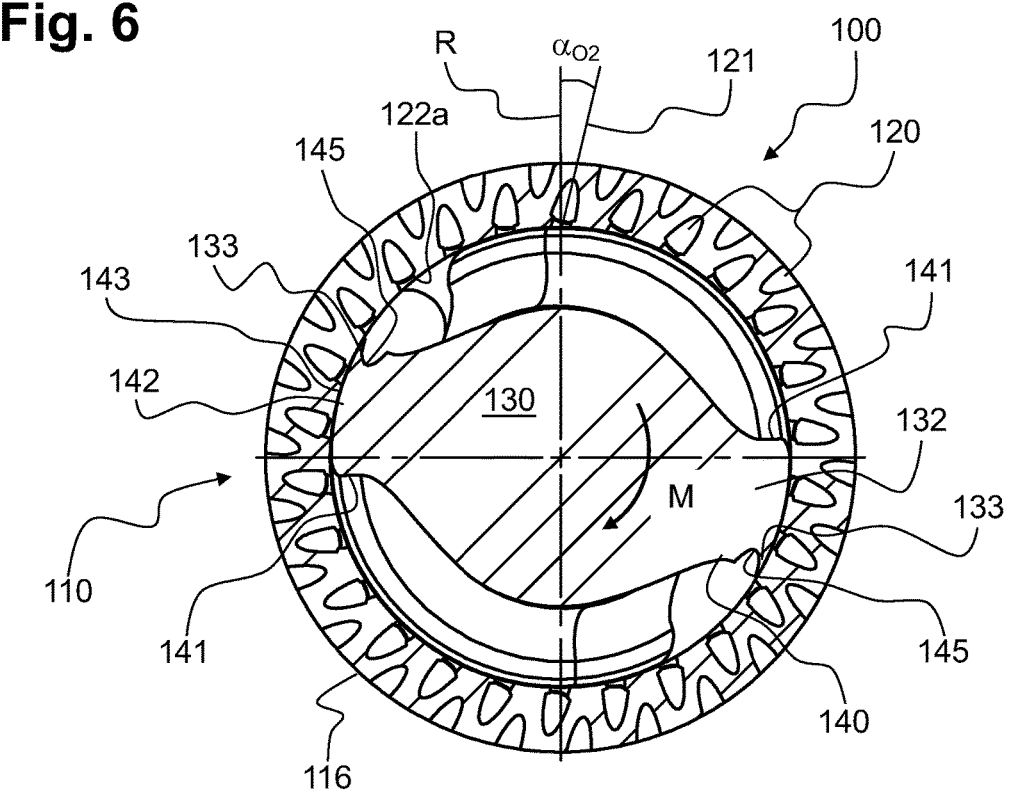

FIG. 6 shows a cross section through the cutting and separating device 100 with a shredding drum 110 according to a second embodiment in the area of the pressure housing portion 116. The cutting openings 120 introduced therein have hole axes 121 which, in addition to the first angle $α_{O1}$, are also inclined with a second angle $α_{O2}$.

The angle $α_{O2}$ is applied laterally to the radius R of the pressure housing portion 116 and is thus spanned in the circumferential direction of the pressure housing portion 116. The hole axis 121, which is additionally inclined at the second angle $α_{O2}$ according to the second embodiment, runs in the direction of the inner wall 117 counter to the direction of rotation M of the conveying screw 130, so that the cutting openings 120 have a cutting opening edge 122a on their side facing away from the front flank 140 of the screw flight 132. The inclination of the hole axis 121 at the second angle $α_{O2}$ results in an equally sharp cutting opening edge 122a between the inner wall 117 of the pressure housing portion 116 and the cutting opening 120 at the same acute angle $α_{O2}$.

LIST OF REFERENCE NUMBERS 100 cutting and separating device
110 shredding drum
111 pressure housing
112 first end portion pressure housing
113 inlet opening
114 second end portion pressure housing
115 outlet opening
116 pressure housing portion
117 inner wall pressure housing portion
118 outer wall pressure housing portion
119a upstream connection means
119b downstream connection means
120 cutting openings
121 axis cutting openings
122 opening edge
122a cutting edge
122b drawing-in edge
130 conveying screw
131 screw shaft
132 screw flight
133 sharpened cutting edge
134 cutting openings sweeping section
135 feeding section
140 front flank
141 rear flank
142 distal end
143 cylindrical portion
144 processing plane
145 groove
146 outer contour groove
147 bevel
148 inner contour groove
$b_S$ width of screw flight
M direction of rotation conveying screw
$R_N$ width groove
$R_S$ radius screw flight
R radius pressure housing portion
X housing longitudinal axis
$α_{O1}$ first angle axis cutting openings
$α_{O2}$ second angle axis cutting openings
$β_O$ offset angle cutting openings
$Ø_O$ diameter cutting openings
γ rake angle cutting edge
δ wedge angle cutting edge

What is claimed is:

1. A conveying screw for a cutting and separating device, comprising:
    a screw shaft having at least one helical screw flight integrally moulded thereon, which, in an installed position, has a front flank for transporting a foodstuff by pushing, a rear flank arranged on the opposite side, and, at its distal end between the front flank and the rear flank, a cylindrical portion, which is formed in the transition region to the front flank of the screw flight with a sharpened cutting edge, the sharpened cutting edge having a positive rake angle (γ) arranged between the front flank and a processing plane oriented at right angles to the screw shaft,
    wherein the sharpened cutting edge is formed from a groove made on a distal end of the front flank, the outer contour of which groove cuts into the cylindrical portion.

2. The conveying screw according to claim 1, wherein the rake angle (γ) is between 10° and 50.

3. The conveying screw according to claim 1, wherein between the front flank and the cylindrical portion there is a wedge angle (δ) of 40° to 80.

4. The conveying screw according to claim 1, wherein a radius or a bevel is arranged between the cylindrical portion and the rear flank.

5. A cutting and separating device with the conveying screw according to claim 1, wherein the conveying screw is rotatably mounted in a pressure housing of a shredding drum, which is formed with an inlet opening at a first end portion and with an outlet opening at a second end portion, wherein that a plurality of cutting openings are arranged in a pressure housing portion of the pressure housing and pass right through the pressure housing portion from an inner wall to an outer wall.

6. The cutting and separating device according to claim 5, wherein the sharpened cutting edge is formed on a sweeping section of the conveying screw which sweeps over the cutting openings.

7. The cutting and separating device according to claim 5, wherein the cylindrical portion of the screw flight has a width (bs) which is at least the diameter ($\varnothing_O$) of the cutting openings on the inner wall.

8. The cutting and separating device according to claim 5, wherein the cutting openings are oriented with hole axes inclined at an angle ($\alpha_{O1}$, $\alpha_{O2}$) in relation to the inner wall.

9. The cutting and separating device according to claim 8, wherein the angle ($\alpha_{O1}$, $\alpha_{O2}$) comprises a first angle ($\alpha_{O1}$) which is arranged on the side of the cutting opening facing away from the inlet opening of the pressure housing between its hole axis and the inner wall.

10. The cutting and separating device according to claim 9, wherein the first angle ($\alpha_{O1}$) is between 60° and 88°.

11. The cutting and separating device according to claim 5, wherein each cutting opening on the inner wall has a cutting opening edge facing the outlet opening and a drawing-in edge facing the inlet opening.

12. The cutting and separating device according to claim 8, wherein the angle ($\alpha_{O1}$, $\alpha_{O2}$) comprises a second angle ($\alpha_{O2}$) which is located in the circumferential direction of the pressure housing portion between the hole axis and the radius (R) of the pressure housing portion.

13. The cutting and separating device according to claim 12, wherein the second angle ($\alpha_{O2}$) is between 2° and 30°.

14. The cutting and separating device according to claim 12, wherein the second angle ($\alpha_{O2}$) is aligned counter to a direction of rotation (M) of the conveying screw.

15. The conveying screw according to claim 2, wherein between the front flank and the cylindrical portion there is a wedge angle ($\delta$) of 40° to 80°, and wherein a radius or a bevel is arranged between the cylindrical portion and the rear flank.

16. A cutting and separating device with the conveying screw according to claim 15, wherein the conveying screw is rotatably mounted in a pressure housing of a shredding drum, which is formed with an inlet opening at a first end portion and with an outlet opening at a second end portion, wherein that a plurality of cutting openings are arranged in a pressure housing portion of the pressure housing and pass right through the pressure housing portion from an inner wall to an outer wall.

17. The cutting and separating device according to claim 16, wherein the sharpened cutting edge is formed on a sweeping section of the conveying screw which sweeps over the cutting openings, and wherein the cylindrical portion of the screw flight has a width (bs) which is at least the diameter ($\varnothing_O$) of the cutting openings on the inner wall.

18. The cutting and separating device according to claim 17, wherein the cutting openings are oriented with hole axes inclined at an angle ($\alpha_{O1}$, $\alpha_{O2}$) in relation to the inner wall, and wherein the angle ($\alpha_{O1}$, $\alpha_{O2}$) comprises a first angle ($\alpha_{O1}$) which is arranged on the side of the cutting opening facing away from the inlet opening of the pressure housing between its hole axis and the inner wall.

19. The cutting and separating device according to claim 9, wherein the first angle ($\alpha_{O1}$) is between 60° and 88°, and wherein each cutting opening on the inner wall has a cutting opening edge facing the outlet opening and a drawing-in edge facing the inlet opening.

20. The cutting and separating device according to claim 19, wherein the angle ($\alpha_{O1}$, $\alpha_{O2}$) comprises a second angle ($\alpha_{O2}$) which is located in the circumferential direction of the pressure housing portion between the hole axis and the radius (R) of the pressure housing portion, wherein the second angle ($\alpha_{O2}$) is between 2° and 30°, and wherein the second angle ($\alpha_{O2}$) is aligned counter to a direction of rotation (M) of the conveying screw.

* * * * *